Nov. 26, 1929.          H. C. SCHROEDER          1,736,941
                        INK FOUNTAIN AND METHOD
                    Filed July 7, 1926      7 Sheets-Sheet 7

H. C. Schroeder INVENTOR.
BY John D. Morgan
ATTORNEYS.

Patented Nov. 26, 1929

1,736,941

UNITED STATES PATENT OFFICE

HANS C. SCHROEDER, OF LA GRANGE, ILLINOIS, ASSIGNOR TO GOSS PRINTING PRESS COMPANY, A CORPORATION OF ILLINOIS

INK FOUNTAIN AND METHOD.

Application filed July 7, 1926. Serial No. 120,909.

My invention relates to printing presses, and more particularly to the ink fountain for such printing presses, and to a method for keeping the pigment of the ink uniformly distributed throughout the body of ink in the fountain. My invention further relates to automatically agitating all the ink in the fountain while the press is running. My invention may be applied either to an ink fountain having an undershot, or an overshot ink roller.

Objects and advantages will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, improvements and method herein shown and described.

The accompanying drawings, referred to herein and constituting a part hereof, illustrate one embodiment of the invention, and together with the description, serve to explain the principles of the invention.

Figures 4, 9:
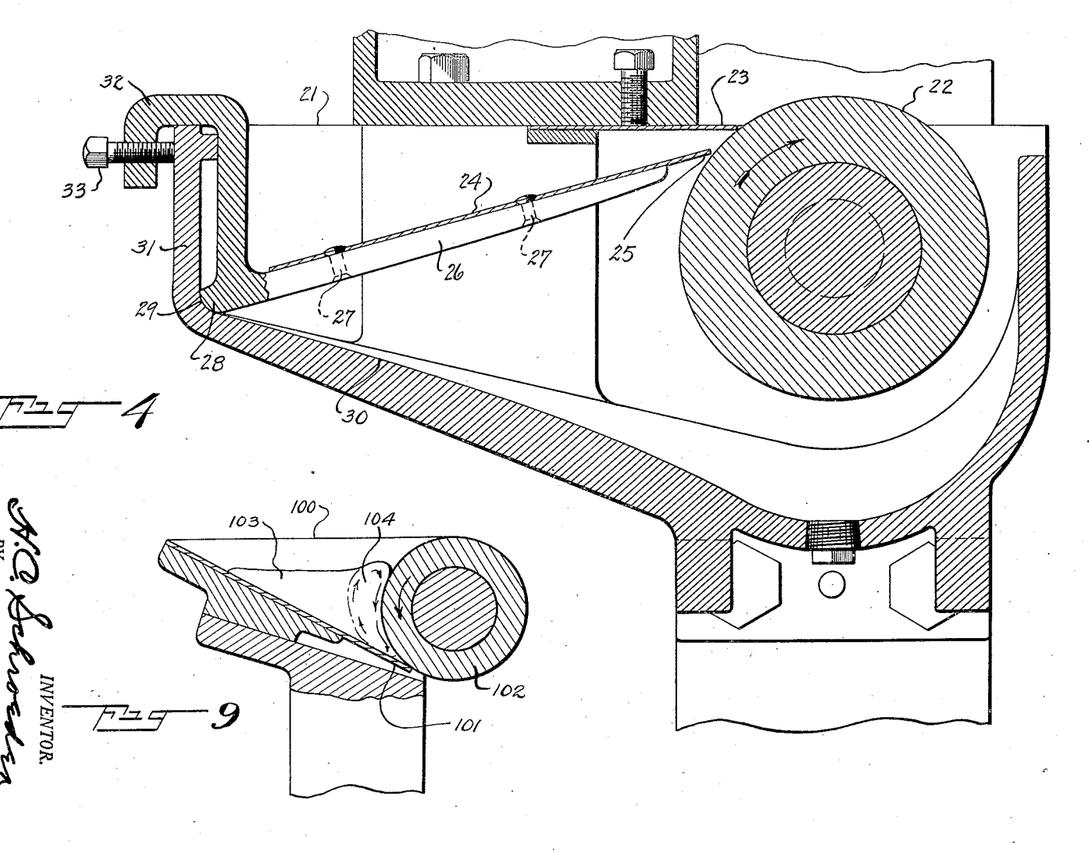
Fig. 4 is a vertical section through an ink fountain of the overshot type equipped with my invention.
Fig. 9 is a diagrammatic view of the old form of the ink fountain now in common use.

To more readily distinguish my invention from other inventions, and to comply with Section 4888 of the Revised Statutes, I shall briefly refer to the form of ink fountain which is now commonly employed with printing presses and which is illustrated, diagrammatically, in Fig. 9.

In this figure the ink fountain 100 has a fountain or doctor blade 101 and an undershot ink or fountain roller 102. The fountain is filled with the ordinary printing ink or fountain 103. As the ink roller 102 rotates as usual in the direction of the arrows, it sets up a local connection current of ink 104 adjacent to the surface of the ink roller 102, leaving the great mass of the ink or fountain 103 dead or unagitated. After the press has been running for a comparatively short time it is found in practice that the pigment is withdrawn or used from the local current of ink designated 104 in Fig. 9, and then the ink, which is fed by the ink or fountain roller 102 to the ductor roll becomes thin and loses color. When this condition arises, under the present practice, the fountain blade 101, has to be opened, somewhat, to obtain sufficient color from the thin ink which is being fed from the local current 104. Again, in the present practice when the press is idle, there is, of course, no local current 104, so that the pigment throughout the body of the ink 103 has a tendency to settle to the bottom of the fountain 100. If this settling has continued any length of time it is necessary to open the fountain or doctor blade 101 to relieve the congestion caused by the settling of this pigment. After this congestion has been relieved, by removing the pigment at this point, it is necessary to close the fountain or doctor blade 101 again against the ink or fountain roller 102 in order to secure the proper amount of ink feed for the ductor roll. Ordinarily, in running color, it is necessary for the pressman to stir up the ink in the fountain by hand about every fifteen minutes.

By my invention I eliminate all these objectionable features, and insure that the pigment in the ink will be uniformly and automatically distributed throughout the ink in the fountain. It will not be necessary to adjust the fountain or doctor blade to permit an additional quantity of thin ink to be taken up by the ink or fountain roller, for in my invention, the coloring content and the consistency of the ink will always be uniform, insuring uniformity of color in the printed product. Further, any tendency that the pigment has to settle out by gravity will be automatically corrected by currents of ink set up, and maintained in the fountain.

My method may be carried out by various forms of apparatus, the invention being applicable both to an undershot and overshot ink or fountain roller. In the accompanying drawings, I have shown my invention applied to fountains equipped with overshot and undershot ink or fountain rollers.

In the drawings (Fig. 1) 1 is a standard form of ink fountain equipped with the ordinary form of undershot or fountain ink roller 2 cooperating with the ordinary form of ductor roll 3. This fountain 1 is provided with the ordinary form of fountain or doctor blade 4 and adjusting members 5, 5 controlled by the screws 6, 6 cooperating with the threaded sockets 7, 7 in the flange 8, all as in the usual practice.

Figures 1, 3:
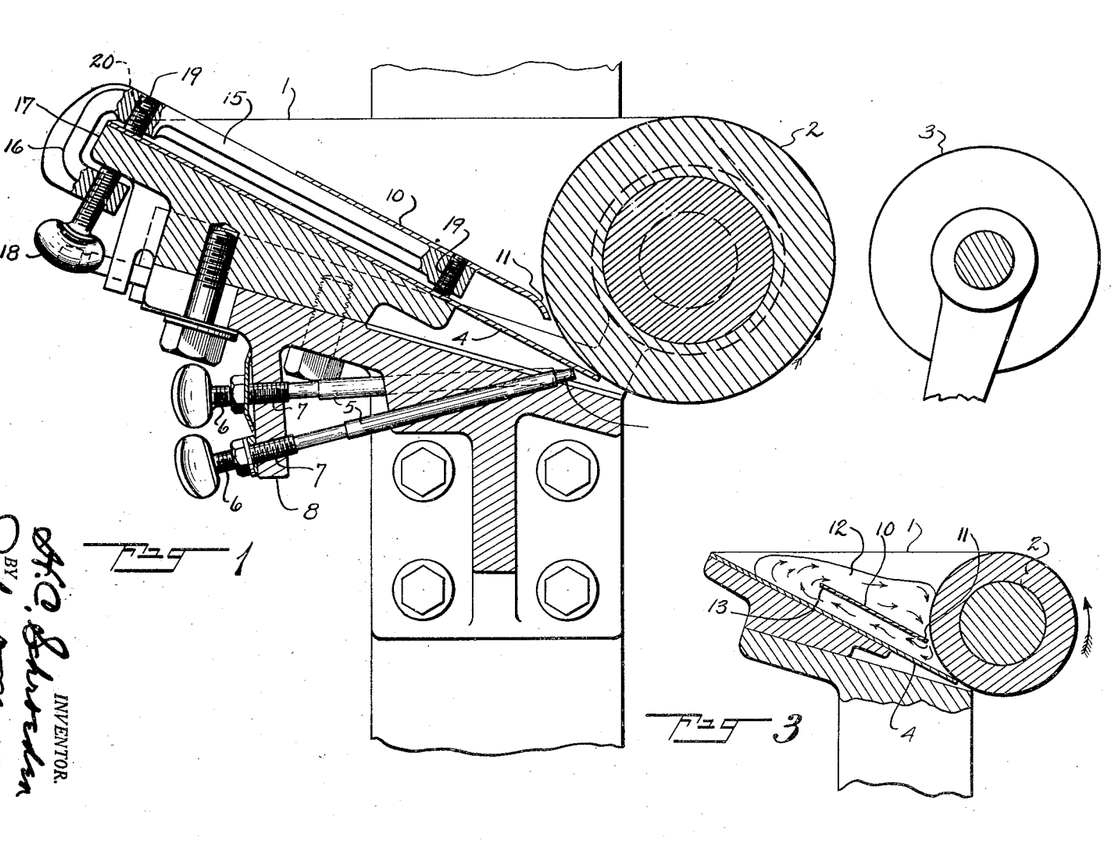
Fig. 1 is a vertical section through an ink fountain of the undershot type equipped with one form of my invention.
Fig. 3 is a diagrammatic vertical section showing the automatic circulation of the ink in the fountain of Fig. 1.

By my method I insure that the entire body of ink within the fountain 1 shall travel automatically in a certain path, and that there will be substantially no dead ink in the fountain and substantially no or any ink traveling in a local current. In this manner, the pigment in the ink is kept uniform throughout the body of the ink which insures that the consistency and coloring matter of the ink will always be uniform; and this, in turn, insures uniformity of color in the printed product. After once adjusting the fountain or doctor blade 4 against the ink or fountain roller 2, to get the proper quantity of ink on the ink or fountain roller so that it can be passed to the ductor roll 3, it is not necessary to readjust this fountain or doctor blade to permit any additional quantity of ink to be fed by the ink or fountain roller to get the necessary pigment, as in the old practice previously described.

The simplest form of my invention consists in mounting a baffle plate 10 in the ink fountain 1 so that its edge 11 is adjacent to the periphery of the ink or fountain roller 2, the baffle plate serving to substantially divide the ink fountain into an upper and lower chamber.

By referring to the diagram in Fig. 3, it will be seen that as the ink or fountain roller 2 rotates in the direction of the arrow in that figure, the entire body of ink 12 in the fountain 1 is caused to circulate towards the end of the fountain or doctor blade 4, but as only a very small quantity passes out between the periphery of the ink or fountain roller 2 and the fountain or doctor blade 4 the great mass of the ink in the fountain cannot escape and, therefore, is caused to travel up the fountain between the fountain or doctor blade 4 and the baffle plate 10 until it passes the upper end 13 of the baffle plate, when it reverses its travel as indicated by the arrows, passing back above the baffle plate to the periphery of the ink or fountain roller 2, thence between the end 11 of the baffle plate and the periphery of the ink or fountain roller 2 in a continuous stream as indicated by the arrows.

It will be seen that in my invention substantially no local current can be set up, that there is no dead ink, and that any pigment that may have a tendency to settle on the bottom of the fountain will be picked up and carried along by the moving stream of ink, so that in a few circuits of the current the pigment will be thoroughly mixed throughout the ink insuring an even color and consistency to the entire body of ink.

Figure 2:
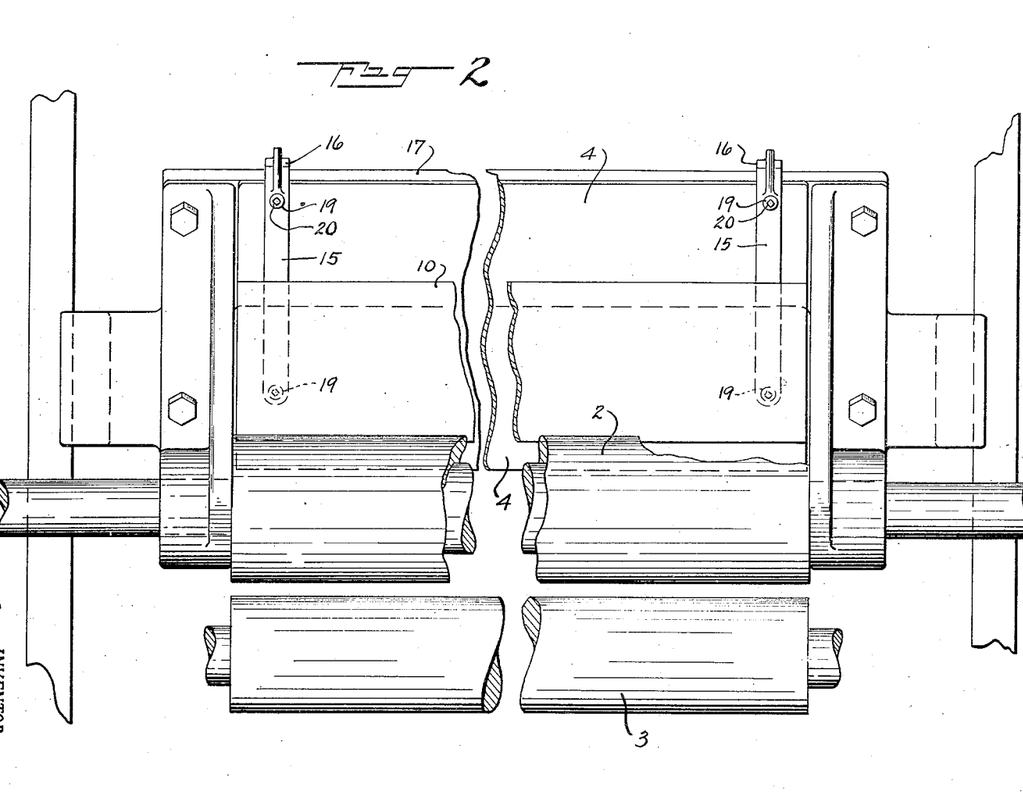
Fig. 2 is a plan view, partly broken away, of the fountain shown in Fig. 1.

This baffle plate 10 may be mounted in the fountain in any suitable manner. I preferably mount it so that it can be readily removed to permit cleaning, and also to permit ready cleaning of the fountain. The baffle plate may be formed in sections, or it may be continuous extending from side to side of the fountain 1 depending upon the form of fountain. I have shown it carried by two arms 15, 15, the arms being provided with hooks 16, for hooking over the edge 17 of the fountain. They may be clamped in place by the thumb screws 18, 18. To space the arms 15, 15 away from the fountain blade 4, I preferably provide the arms with screws 19, 19 having non-circular sockets 20, 20 for the reception of a suitable tool to rotate them.

I preferably, though not necessarily, bend down the end 11 of the baffle plate 10, as shown in Fig. 1, which helps to insure complete circulation of the entire body of ink in the fountain, and prevents the formation of any local currents circulating above the baffle plate. By bending the end 11 down a sort of suction is created below the baffle plate, and this draws the ink down below the baffle plate 10.

In Fig. 4 I have shown the preferred form of my invention applied to an ink fountain having an overshot ink or fountain roller. In this form, the ink fountain 21 has the overshot or fountain ink roller 22 and the fountain or doctor blade 23, all of usual construction. In this preferred form my baffle plate 24 is supported so that its end 25 is brought adjacent to the fountain or doctor blade 23 and at an angle to the bottom of the fountain. In this form the baffle plate is carried by arms 26, 26, being preferably riveted thereto by the rivets 27, 27. These arms have a heel portion 28 which are seated in the angle 29 between the bottom 30 and the side 31 of the fountain. The arms 26 are provided with hooks 32 so that they may be secured to the side 31 of the fountain by a clamping bolt 33.

Figure 5:
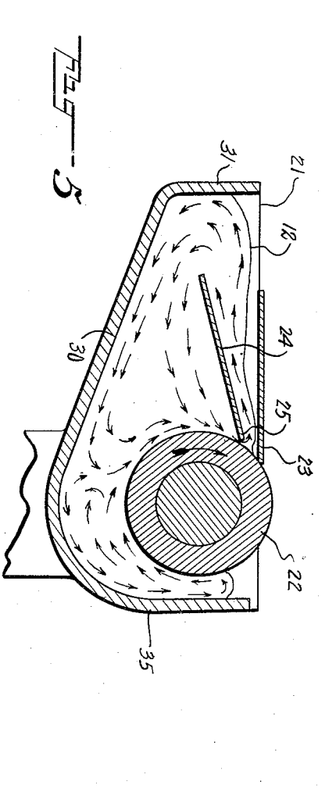
Fig. 5 is a diagrammatic vertical section showing the automatic circulation of the ink in the fountain of Fig. 4.

By reference to the diagram of Fig. 5, it will be seen that the ink 12 in the fountain 21 will be caused to circulate as indicated by the arrows in that figure. The ink in contact with the ink or fountain roller 22 will move with that roller and pass under the end 25 of the baffle plate 24. As only a very small quantity can escape between the periphery of the ink or fountain roller 22 and the end of the fountain or doctor blade 23 the surplus ink will be scraped off by the fountain or doctor blade 23 and caused to travel above the baffle plate 24 and thence to the side 31 of the ink fountain where the ink will form two currents, the upper current passing by a short cut under the baffle plate 24 to the periphery of the inking or fountain roller 22, whereas another portion of the ink will travel along the bottom of the fountain until it reaches the end 35 of the fountain and then into contact with the periphery of the inking or fountain roller 22. A portion of the ink will not reach the end 35, but will be deflected and make a short cut, being acted upon by the current of ink traveling adjacent to the periphery of the ink or fountain roller 22. These different currents of ink will all meet or merge between the end 25 of the baffle plate 24, and the periphery of the ink or fountain roller 22 as shown by the arrows, so that there will be a complete commingling and movement of all the ink in the fountain, with the same advantages of thorough mixing of the pigment and of uniform consistency and coloring matter of the ink, together with the other advantages described in connection with the first form.

Figure 6:
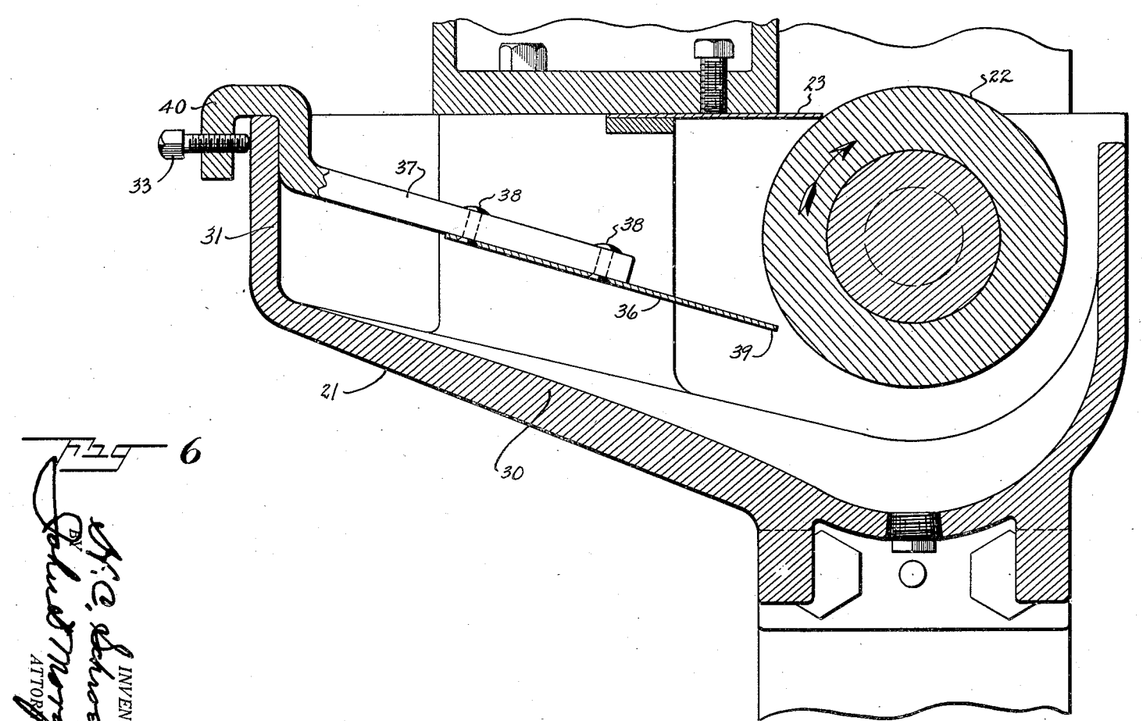
Fig. 6 is a vertical section of an ink fountain equipped with an overshot ink or fountain roller, but showing a modification of my invention.
Figure 7:
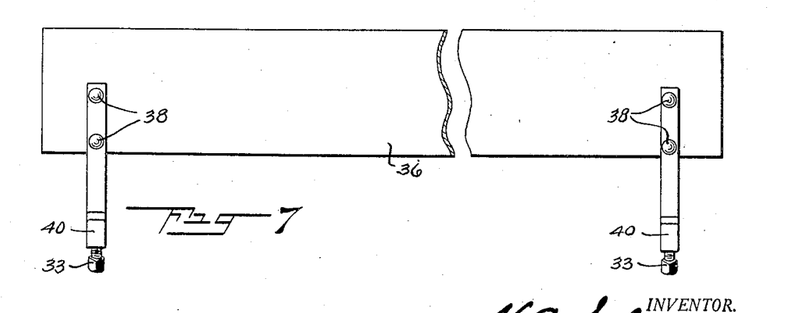
Fig. 7 is a detail plan view of one form of my baffle plate.
Figure 8:
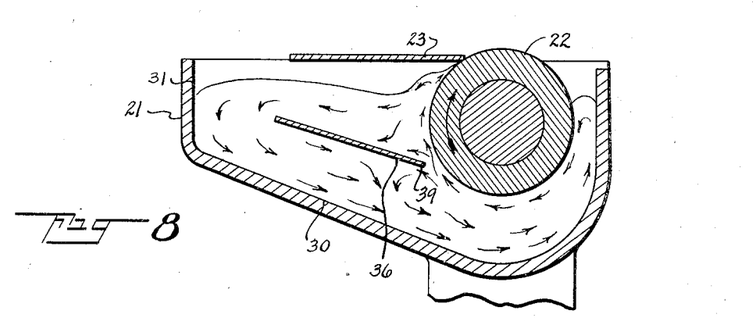
Fig. 8 is a diagrammatic view showing the automatic agitation and the current of ink in the fountain of Fig. 6.

In Fig. 6, and diagrammatically in Fig. 8, I have shown a different manner of mounting my baffle plate with an overshot ink or fountain roller, though I prefer the arrangement shown in Fig. 4 and diagrammatically in Fig. 5.

In this form of my invention, the baffle plate 36 is mounted on the arms 37 by means of rivets 38, 38, or in any other suitable manner, so that the end 39 of the baffle plate will be removed from the fountain or doctor blade 23. The arm 37 is provided with a hook 38 and a clamping screw 33 to clamp it to the side 31 of the ink fountain 21.

By reference to the diagrammatic view, Fig. 8, it will be seen that there is no dead ink in the fountain 21, but, on the contrary, the entire body of ink is in circulation and moving substantially as indicated by the arrows. This form has the same numerous advantages that I have described for the other form, though I prefer, as previously stated, the arrangement shown in Figs. 4 and 5 for an overshot ink or fountain roller.

Figure 10:
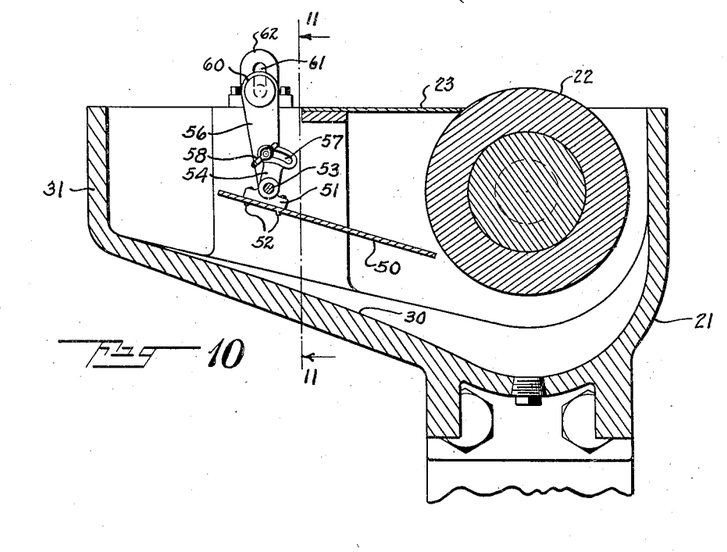
Fig. 10 is a vertical section through an ink fountain showing a modification in which the baffle plate is adjustable.
Figure 11:
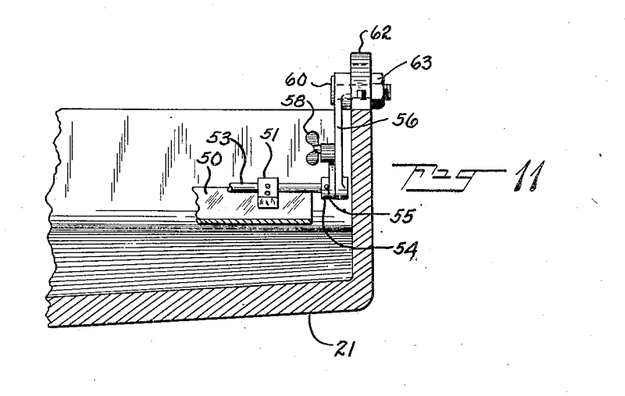
Fig. 11 is a fragmentary vertical section on line 11—11 of Fig. 10.
Figure 12:
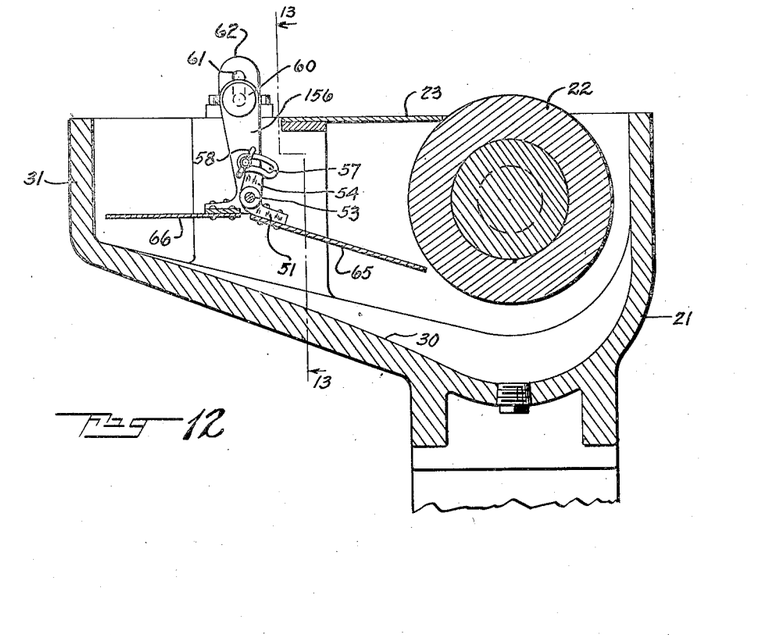
Fig. 12 is a vertical section through an ink fountain showing a different modification of an adjustable baffle plate.
Figure 13:
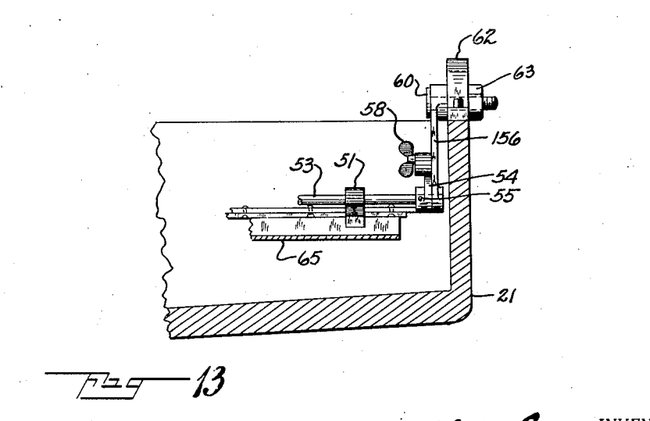
Fig. 13 is a fragmentary vertical section on the line 13—13 of Fig. 12.

In Figs. 10 and 11, and also in Figs. 12 and 13 I have shown a baffle plate which is adjustable in the fountain. By this, it is meant that means are provided to vary the position of the baffle plate horizontally, vertically, and also to vary its angular inclination within desirable limits.

With more particular reference to Figs. 10 and 11 the baffle plate 50 is secured to two brackets 51, 51 (only one being shown) by rivets 52, 52 or other suitable securing means. These brackets are keyed to a rod 53 to which slotted levers 54, 54 are also keyed by keys 55, 55, the ends of the rod 53 being journaled loosely in the arms 56, 56 (only one illustrated). I will describe simply one set of adjusting mechanism, it being understood that such mechanism is duplicated at the other side of the fountain. The lever 54 is provided with an arcuate adjusting slot 57, through which extends an adjusting thumb screw 58, carried by the arm 56. This arm 56 is pivoted on the stud 60 mounted in the slot 61 in the bracket 62 fast on the fountain 21.

It is clear that by loosening the nuts 63, 63 the baffle plate 50 and arms 56, 56 can be adjusted in a vertical direction by repositioning the studs 60, 60 in the slots 61, 61, and again tightening the nuts 63, 63. This also permits the entire baffle plate 50 with its connected parts to be adjusted to or from the ink roller 22, by rocking the arms 56, 56 on the studs 60, 60, with or without any vertical adjustment.

By means of the arcuate slots 57, 57 in the levers 54, 54 the baffle plate 50 can be given a secondary arcuate adjustment to or from the ink or fountain roller 22. It will, therefore, be clear that my baffle plate 50 is radially adjustable by means of the studs 60, 60 being adjustable in the slots 61, 61; that it has an arcuate or angular adjustment by means of the arms 56, 56 being pivoted on the studs 60, 60 and adapted to be held in any adjusted position by means of the nuts 63, 63; and that the baffle plate 50 has a secondary arcuate adjustment by means of the arcuate slots 57, 57 in the levers 54, 54 cooperating with the thumb screws 58, 58.

By virtue of the above described means to vary the position of the baffle plate, it is readily seen that means are provided whereby the direction of the currents in the fountain can be varied at will. The flow of the ink and the convection currents set up by the movement of the fountain roller depend to a great extent on the character of the particular ink used, the temperature at a given time, and a number of other conditions. It is therefore highly desirable to vary the position of the baffle plate to meet these conditions and direct the convection currents of ink so as to obtain the most efficient and constant mixture. Experience has shown that in using this invention the best results are obtained by very nicely positioning the baffle plate for each set of conditions.

In Figs. 12 and 13 I have shown another modification wherein the adjustment of the baffle plate is the same as in Figs. 10 and 11 just described.

In this form I make the baffle plate in a plurality of parts. In the form shown by way of illustration the baffle plate is formed of the adjustable portion 65 which is substantially the same as the baffle plate 50 in Figs. 10 and 11. The heel portion 66 of the baffle plate is secured in any suitable manner to extensions 67, 67 on the arms 156, 156, said arms being similar in all respects to the arms 56, 56 except they are provided with these extensions. By adjusting the portion 65 of the baffle plate without relation to the heel portion 66, a substantially curved baffle plate is obtained. This curvature can be changed within the limits of the arcuate adjustment of the slots 57, 57.

By virtue of the above described means it is possible to nicely position not only the whole baffle plate, but to change the form thereof to meet a given set of conditions. This variably positioning of a section of the baffle plate thus introduces an additional variation into the form of the baffle plate, whereby the form of a curved plate can be approximated and its curvature changed at will within desired limits.

It is to be understood that the statement of the theory of operation of applicant's invention is that founded on applicant's understanding at the present time, but should not be construed as restrictive of the actual manner of operation, which is in practice to secure the results stated.

I am aware that different kinds of agitators for stirring the ink in fountains have been employed, but they have proved unsuccessful in practice in addition to obstructing the filling and cleaning of the fountain.

The invention in its broader aspects is not limited to the specific mechanisms shown and described but departures may be made therefrom within the scope of the accompanying claims without departing from the principles of the invention and without sacrificing its chief advantages.

What I claim is:—

1. The method of thoroughly mixing and keeping all portions of the printing ink in an ink fountain of a printing machine of uniform color and consistency consisting in causing the ink in the fountain to move along the bottom of the fountain to pick up any pigment that might have a tendency to settle out and mix it thoroughly through the body of the ink in the fountain.

2. The method of thoroughly mixing and keeping all portions of the printing ink in an ink fountain of a printing machine of uniform color and consistency consisting in causing the ink in the fountain to travel along a predetermined path, a portion of the path being along the bottom of the fountain.

3. The combination in an ink fountain of a printing machine, an ink roller, and a movable baffle plate cooperating with the roller and provided with means to hook over the edge of the fountain.

4. An ink fountain for a printing press including in combination an undershot fountain roller adapted to rotate therein, and a baffle plate mounted in the fountain having one edge adjacent the fountain roller, said edge being curved downward.

5. An ink fountain for a printing press including in combination an undershot fountain roller adapted to rotate therein, and a baffle plate mounted in the fountain having one edge adjacent and parallel to the fountain roller, said edge being curved downward, and having the opposite edge spaced apart from the fountain wall.

6. An ink fountain including in combination a fountain roller adapted to rotate therein, a flexible variantly tensionable fountain blade cooperating therewith and means for directing the currents set up by the rotation of the fountain roller to remote parts of the fountain.

7. An ink fountain including in combination a fountain roller adapted to rotate therein, a flexible variantly tensionable fountain blade cooperating therewith and a baffle plate cooperating with the convection currents set up by the drag of the fountain roller through the ink to maintain the ink in a substantially uniform state.

8. An ink fountain including in combination an undershot fountain roller adapted to rotate therein, a fountain blade, means for controlling the amount of ink fed from the fountain with regulable uniformity and stationary means spaced from the blade for maintaining uniform the ink in the fountain.

9. An ink fountain having mounted therein a rotatable undershot fountain roller, a fountain blade co-operating therewith and means spaced from and substantially parallel with said fountain blade for directing the ink currents induced by the rotation of the fountain roller away from their upward course and through the mass of ink.

10. The method of maintaining uniform the ink contained in an ink fountain of a printing press which includes setting up convection currents in the ink fountain as ink is fed to the press and impelling the ink subject to the convection currents through the mass of ink in the fountain whereby the solid particles in the ink are maintained in even and uniform distribution throughout the mass of ink.

11. The method of maintaining uniform the ink contained in an ink fountain of a printing press which includes setting up a local convection current in an ink fountain and continuously circulating the solid pigmentous particles uniformly throughout the ink in the fountain by diverting the convection currents through the mass of ink in the fountain.

12. An ink fountain including in combination a fountain roller adapted to rotate therein, a flexible fountain blade cooperating therewith for regulating the ink fed from the fountain and means for directing the currents set up by the rotation of the fountain roller to remote parts of the fountain.

In testimony whereof, I have signed my name to this specification.

HANS C. SCHROEDER.